United States Patent [19]
Feuz

[11] 3,722,632
[45] Mar. 27, 1973

[54] TRAVELLING CARRIAGE MECHANISM FOR AERIAL CABLE CARS

[75] Inventor: Fritz Feuz, Canton of Bern, Switzerland

[73] Assignee: Von Roll AG. Werk, Bern, (Canton), Switzerland

[22] Filed: Feb. 24, 1971

[21] Appl. No.: 118,395

[30] Foreign Application Priority Data

Dec. 17, 1970 Switzerland..........................18749/70

[52] U.S. Cl....................................188/42, 105/148
[51] Int. Cl................................................B61h 9/02
[58] Field of Search..............................105/148, 150; 188/41–44

[56] References Cited

UNITED STATES PATENTS

| | | | |
|---|---|---|---|
| 3,017,958 | 1/1962 | Richter | 188/43 |
| 3,369,501 | 2/1968 | Tsuchimochi | 188/42 X |
| 3,451,507 | 6/1969 | Santos | 188/41 X |

Primary Examiner—Duane A. Reger
Attorney—Werner W. Kleeman

[57] ABSTRACT

A travelling carriage mechanism for aerial cable cars or the like, especially for swinging aerial cable cars, equipped with brake means, which is manifested by the features that there is provided a travelling support carriage and a travelling brake carriage which carries the brake means and which is hingedly connected with one end of the travelling support carriage.

5 Claims, 6 Drawing Figures

3,722,632

INVENTOR
FRITZ FEUZ
BY
WERNER W. KLEEMAN
ATTORNEY

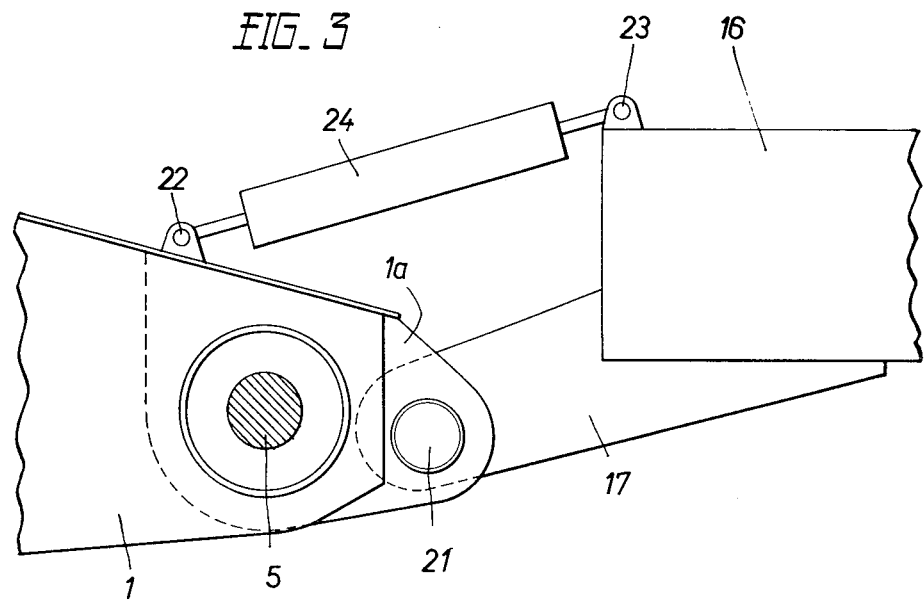
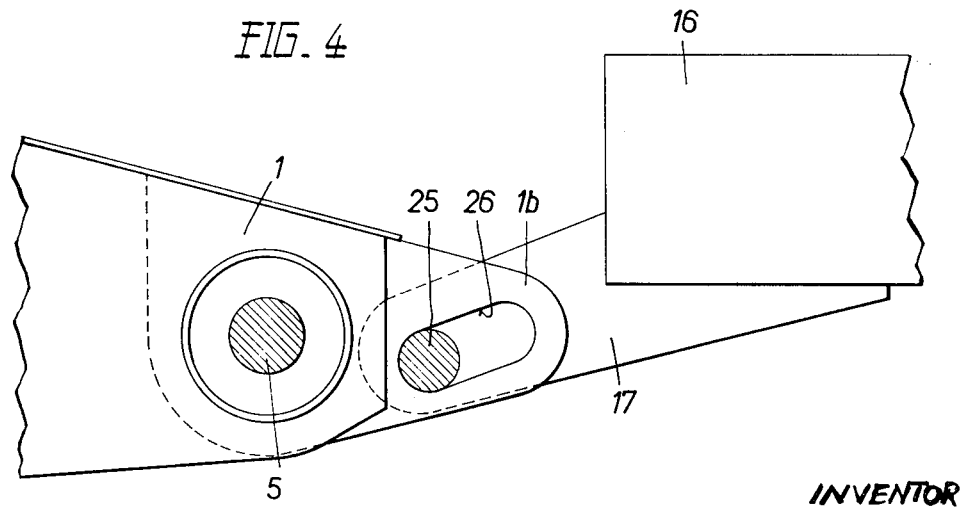

TRAVELLING CARRIAGE MECHANISM FOR AERIAL CABLE CARS

BACKGROUND OF THE INVENTION

The present invention relates to a new and improved travelling carriage mechanism for aerial cableways, especially for the so-called swinging- or pendulum-type aerial cable cars or cableways, equipped with brake mechanisms.

Up to the present the state-of-the-art aerial cableways provided an arrangement wherein the brake mechanisms were located at the travelling carriage in the lengthwise direction thereof between support rollers. This type of construction is associated with numerous disadvantages, particularly as concerns the aspect of accessibility of the components of the system. More precisely, there is here to be mentioned that the brake mechanisms were particularly poorly accessible for the purpose of performing maintenance work, and further this arrangement rendered more difficult measuring of the braking force during periodic checking of the aerial cable car, and wherein the parameters could be easily falsified by virtue of the pulling forces exerted by the traction cable. Additionally, there should be taken into account that during momentary lift-off of the travelling carriage mechanism from the support cable or from the support cables, upon passing over the supports or pylons ("Wettstein-effect") and just then, for instance, owing to a fissure of the brake mechanisms actuating the traction or pulling cable at the upside or mountain side of the aerial cable car, the brake jaws do not come into engagement with the support cable, rather come to bear against one another above the support cable.

SUMMARY OF THE INVENTION

Accordingly, there is still present a real need in the art for a travelling carriage for aerial cableways which is not associated with the aforementioned drawbacks. Hence, a primary objective of the instant invention is to provide just such a travelling carriage mechanism which effectively and reliably overcomes the aforementioned drawbacks of the prior art constructions and fulfills the existing need.

Another and more specific object of the present invention is to provide a travelling carriage mechanism which overcomes the aforenoted disadvantageous inaccessibility experienced with the prior art constructions.

Now, in order to implement these and still further objects of the invention, which will become more readily apparent as the description proceeds, the invention is manifested by the features that the travelling carriage mechanism incorporates a travelling support carriage and a travelling brake carriage supporting the brake mechanisms and pivotably or hingedly connected with one end of such travelling support carriage.

BRIEF DESCRIPTION OF THE DRAWINGS

The invention will be better understood and objects other than those set forth above will become apparent when consideration is given to the following detailed description thereof. Such description makes reference to the annexed drawings wherein:

FIGS. 1 and 1a are respective elevational views of the travelling carriage mechanism of the invention, partially shown in cross-section, taken along the line I—I of FIGS. 2 and 2a, wherein FIG. 1 is an elevational view of the structure shown in FIG. 2 and FIG. 1a is an elevational view of the structure shown in FIG. 2a;

FIGS. 2 and 2a are respective top plan views of FIGS. 1 and 1a;

FIG. 3 is an enlarged fragmentary view of a detail of the embodiment of FIGS. 1, 1a, 2 and 2a, partially in elevation and partially in section; and FIG. 4 is a fragmentary elevational view, partially in section, or a modified version of the detail shown in FIG. 3.

DETAILED DESCRIPTION OF THE PREFERRED EMBODIMENTS

Figure 1:
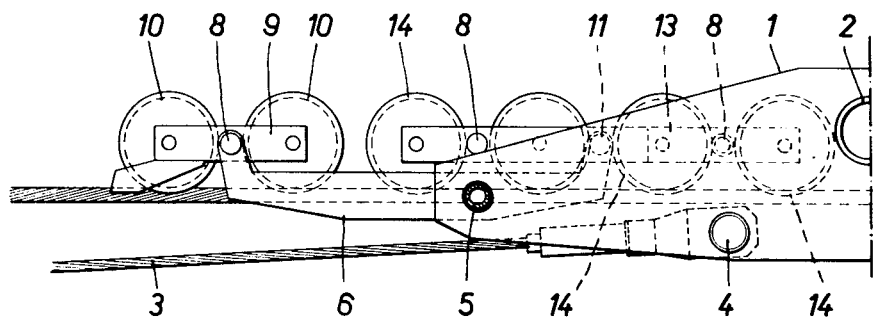
Figure 2:
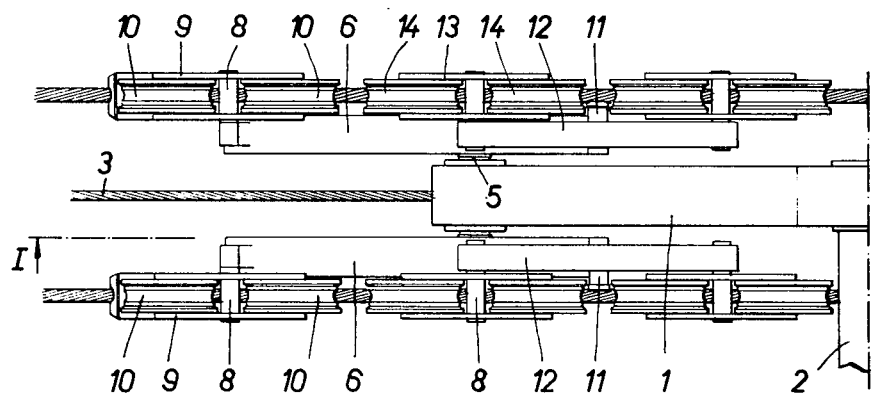
Figure 1A:
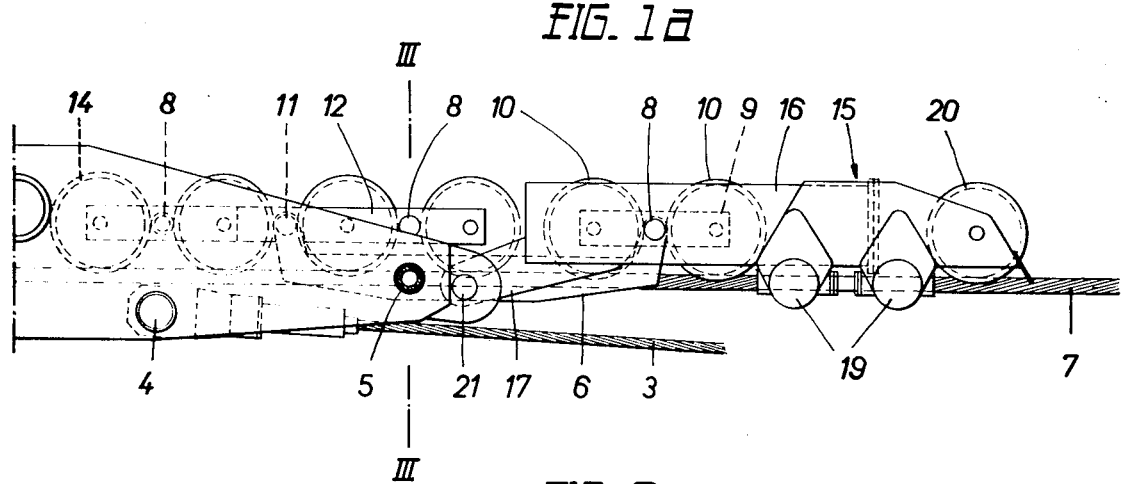
Figure 2A:
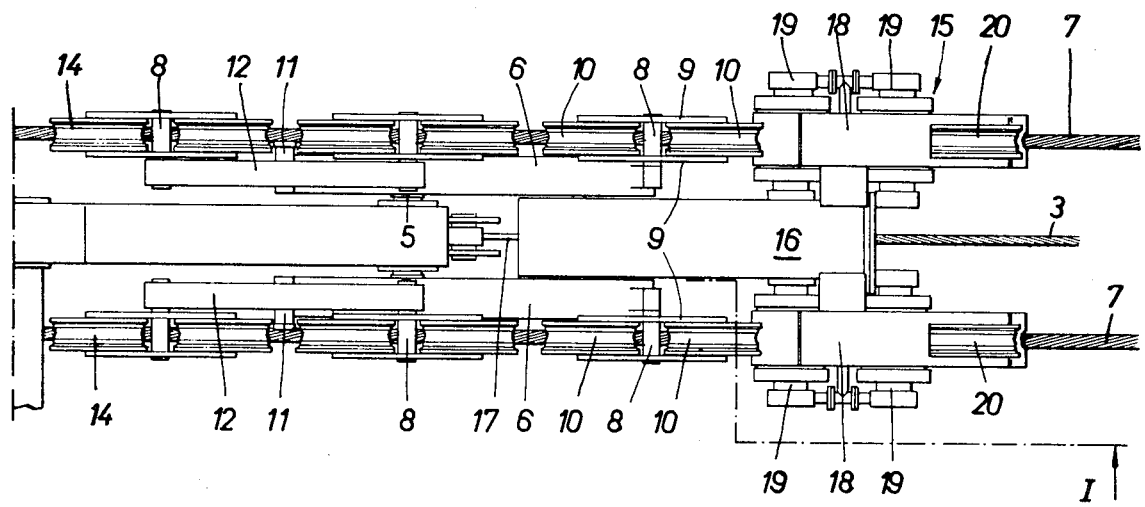

Describing now the drawings, the exemplary embodiment of travelling carriage mechanism will be seen to embody a hollow main carrier 1 formed as a welded construction and which defines the travelling support carriage belonging to the travelling carriage mechanism of the invention. At the longitudinal central region of this main carrier 1 there is pivotably mounted the horizontally extending overhang beam or arm of the suspension system for the aerial cabin, the pivotal movement being about a transversely extending axis, as best recognized by referring to FIGS. 1 and 1a. The ends of the traction or pulling cable 3 are connected in any suitable fashion with the main carrier 1 at locations 4 appearing in these Figures. Furthermore, at locations 5 of the main carrier 1 of the support carriage there are mounted the balance or rocker arms 6. Since in the embodiment under consideration there is taught, by way of example, a travelling carriage mechanism for a double cable-swinging aerial cableway, the balance or rocker arms 6 are arranged in pairs at both sides of the main carrier 1, as best observed by referring to FIGS. 2 and 2a. Both of the support cables have been designated by the reference character 7. Now, at each of the balance or rocker arms 6 there are mounted at the locations 8 further balance or rocker arms 9 equipped with two support rollers 10, while at the locations 11 there are mounted the balance or rocker arms 12 which, in turn, carry two further respective rocker arms 13 each equipped with two support rollers or rolls 14.

Now, according to the invention, it is contemplated that no brake mechanism is provided at the region of the main carrier 1. Quite to the contrary, in this construction there is pivotably connected with one end of the above-described travelling support carriage a travelling brake carriage equipped with appropriate brake mechanisms, the entire unit being generally referenced by reference numeral 15. The brake carriage 15 is here equipped with a conventional spring storage-brake mechanism of known construction, and wherein for clarity in illustration only the housing 16 for the spring storage arrangement has been conveniently shown, there also having been omitted for the sake of clarity in illustration the plate springs. An arm or overhang beam 17 is secured to this housing 16, and furthermore, at the end of such travelling brake carriage 15 remote from the travelling support carriage 1 there are additionally secured two beams 18. These beams 18 support the brake mechanisms 19 (brake cylinder- and pistons and brake jaws) associated with the above-mentioned brake device. Directly adjacent the brake mechanisms 19 these beams 18 also support a respective support roller 20 as best observed by referring to FIGS. 1a and 2a. It will be observed that the brake housing 16 for the brake actuation-spring storage means extends along a portion of its length in the form of a center pole or shaft of a carriage or wagon between the balance or rocker arms 6 of the support carriage located at this position.

As will be best observed by referring to FIG. 3, the free end of the overhang beam or arm 17 is pivotably connected by means of a pivot pin 21 with an eyelet 1a of the main support or carriage 1. It will also be observed that the neighboring ends of the main carriage 1 and the spring storage housing 16 are coupled with one another through the agency of a coupling mechanism 24 equipped with a non-illustrated compression spring means and stop means which act in response to traction forces, mechanism 24 being hingedly connected with the main carriage 1 and the brake carriage 16 at locations 22 and 23, respectively. Furthermore, the line of action of this mechanism 24 will be seen to be located above the pivot location 21 of the overhang arm or beam 17 at the main carriage 1, resulting in the fact that in the presence of a traction or tension load the bowing of the entire travelling carriage arrangement at location 21 will be limited in the upward direction.

In the modified version of FIG. 4, which likewise deals with the detail shown in FIG. 3, the pivotal connection between the overhang arm or beam 17 and the main carriage 1 is here constructed in the form of a sliding hinge joint, wherein a pivot pin 25 secured to the overhang arm 17 piercingly extends through an elongate hole or aperture 26 of the eyelet 1b secured to the main carriage or support 1, this elongate hole being inclined upwardly in a direction towards the spring storage housing 16. This construction results in an upward displacement of the support carriage with respect to the brake carriage when a braking action is exerted during climbing up the mountain, resulting in a favorable effect during the momentary lifting tendency of the carriage mechanism during passing over of the supports or pylons.

While there is shown and described present preferred embodiments of the invention, it is to be distinctly understood that the invention is not limited thereto but may be otherwise variously embodied and practiced within the scope of the following claims.

Accordingly, what is claimed is:

1. A travelling carriage mechanism for aerial cableways, especially for suspended swinging aerial cable cars, equipped with brake mechanisms, comprising a travelling support carriage, a travelling brake carriage provided with brake mechanisms, at least one support cable for supporting said travelling support carriage and said travelling brake carriage, rocker arm means equipped with support rolls travelling upon said support cable and provided for said travelling support carriage, means for pivotably connecting said travelling brake carriage with one end of said travelling support carriage, and traction cable means for selectively displacing said travelling support carriage and travelling brake carriage along said support cable.

2. The travelling carriage mechanism as defined in claim 1, wherein said brake carriage essentially comprises a spring storage-brake housing, an overhang beam forming at least part of said pivotably connecting means rigidly connected at one end with said brake carriage and pivotably connected at the other end with said support carriage, and at least one beam member secured to said end of said brake housing facing away from said support carriage, said brake mechanisms and a support roll situated directly adjacent said brake mechanisms carried by said beam member.

3. The travelling carriage mechanism as defined in claim 2, further including a second support cable to provide a double cable-suspended aerial cableway, said travelling support carriage embodying a main carrier extending between the two support cables, said travelling support carriage being provided with said rocker arm means equipped with said support rolls at each side of said main carrier, said brake housing of said brake carriage extending along a portion of its length in the form of a carriage center pole between said support rolls of said rocker arm means, the respective lengthwise extending axis of said brake housing portion and overhang beam being substantially in alignment with the lengthwise extending axis of said main carrier.

4. The travelling carriage mechanism as defined in claim 3, further including mechanism hingedly connected between neighboring confronting ends of said support carriage and said brake housing for operatively coupling said support carriage and brake housing with one another, said mechanism possessing a line of action which is located above the pivotal connection of said overhang beam with said support carriage.

5. The travelling carriage mechanism as defined in claim 3, wherein the pivotable connection of said other end of said overhang beam with said support carriage is defined by a sliding pivot connection mechanism effective in the lengthwise direction of travel of said support carriage and incorporating a pivot pin member secured to said overhang beam, an eyelet having an elongate hole upwardly inclined towards said brake housing provided at said support carriage, said pivot pin member extending through said elongate hole.

* * * * *